(12) United States Patent
Mattisson

(10) Patent No.: US 6,925,296 B2
(45) Date of Patent: Aug. 2, 2005

(54) SOUND-BASED PROXIMITY DETECTOR

(75) Inventor: Sven Mattisson, Bjärred (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 335 days.

(21) Appl. No.: 10/036,666

(22) Filed: Dec. 21, 2001

(65) Prior Publication Data
US 2002/0086656 A1 Jul. 4, 2002

(30) Foreign Application Priority Data
Dec. 28, 2000 (SE) .............................. 0004889

(51) Int. Cl.$^7$ ................................ H04B 1/06
(52) U.S. Cl. .................. 455/355; 455/569.1; 367/127; 367/118; 367/99
(58) Field of Search ................. 455/569.1, 550.1, 455/575.1, 90.1–90.3, 567, 89, 79, 456.1, 456.3, 457, 67.14, 67.7, 556.2, 556.1, 575.6, 240.1, 232.1, 415, 9, 237.1, 355; 367/127, 96, 87, 118, 99, 95, 128, 101; 379/422, 420, 430, 428, 58, 56, 61, 388, 215, 127, 406.2, 406.06, 406.08, 388.06, 411, 388.05, 433, 142, 406.1, 406.04, 406.11; 381/56, 55, 58, 60, 312, 313, 71.1, 71.6; 370/288, 286, 289; 704/236

(56) References Cited

U.S. PATENT DOCUMENTS

| 4,490,584 A | * | 12/1984 | Lucey | ........................ 379/56.3 |
| 5,224,151 A | * | 6/1993 | Bowen et al. | ........... 455/569.1 |
| 5,872,743 A | * | 2/1999 | Maxwell | ....................... 367/96 |
| 6,542,436 B1 | * | 4/2003 | Myllyla | ....................... 367/95 |
| 6,547,620 B1 | * | 4/2003 | Hatamura et al. | .......... 455/415 |

* cited by examiner

Primary Examiner—Edward R. Urban
Assistant Examiner—Charles Chow
(74) Attorney, Agent, or Firm—Potomac Patent Group PLLC

(57) ABSTRACT

A proximity detector for use in a mobile telephone having at least a microphone and a loudspeaker operatively connected to a signal processor is presented. The proximity detector includes data processing and control modules having a module for controlling the signal processor for activating the loudspeaker to reproduce an acoustic control signal. A correlator correlates a control signal received directly by the microphone and a control signal being reflected from a user of the telephone and then received by the microphone to determine the distance between the telephone and the user. A signal level controller controls the signal processor to vary the signal level of an audible signal reproduced by the loudspeaker proportionally to the determined distance between the telephone and the user.

12 Claims, 5 Drawing Sheets

SOUND-BASED PROXIMITY DETECTOR

This application claims priority under 35 U.S.C. §§ 119 and/or 385 to application Ser. No. 0004889-2 filed in Sweden on Dec. 28, 2000, the entire content of which is hereby incorporated by reference.

FIELD OF THE INVENTION

The present invention relates to a proximity detector, and more particularly to a sound-based proximity detector for use in a mobile telephone apparatus for varying the loud speaker sound level depending on the distance between the phone and the user of the phone.

BACKGROUND OF THE INVENTION

Conventional mobile phones provide manual adjustment of the loud speaker sound level by means of a press button or a sliding button etc.

Assuming a first case where a mobile phone detects an incoming call, and a ring signal is generated in the phone. For answering the call, the user has to press a key on the keypad of the phone in order to generate an off-hook signal. Then, he puts the phone to his ear and starts to speak with and listen to the calling party.

In a second case, when the user does not want to or can put the telephone to his ear immediately on answering the call, he similarly makes an off-hook signal, but answers the call without immediately moving the phone to his ear. Analog sound wave signals are received in the microphone and they are converted to digital signals before they are sent to the calling party. If the loudspeaker volume is set to providing a normal level of the sound (suitable when the phone is held close to the ear), the user will not be able to hear the calling party. Hence, the user has to increase the volume by manually adjusting the volume by means of the press button or sliding button. However, when the user has increased the volume to a level appropriate for a distance of about 50 cm, between the ear and the loudspeaker, and then moves the phone close to his ear, the volume will be too high. Hence, the user will have to decrease the sound level manually.

In these cases it is desirable to have a mobile phone which automatically detects when the phone is close to the ear or when it is at some distance from the ear and which adjusts the sound level accordingly. This function is, however, not provided by conventional prior art mobile phones.

JP-9/252333 discloses an audio conference device providing a constant listening level even if the position of a voice input device is changed in relation to a voice output device. This object is solved by installing an ultrasonic wave oscillating part in the vicinity of the voice output device and installing an ultrasonic wave receiving part in the vicinity of the voice input device and comparing a received signal with a reference signal. The distance between the microphone and the speaker is calculated from a pulse time difference between a pulse signal transmitted from the output device to the input device and a corresponding reference signal. Then, the speaker sound volume is regulated in accordance with the distance.

This solution is, however, not applicable in a mobile phone application because the microphone and the loudspeaker is mounted in a casing in the mobile phone and the distance between the microphone and the loudspeaker is fixed and does not change.

U.S. Pat. No. 4,490,584 discloses a telephone system having a remote microphone and an associated transmitter, and a network located receiver for signals outgoing over the telephone network and including a local loudspeaker to broadcast signals incoming over the telephone network, wherein the loudspeaker audible level is controlled to vary with the level of the received microphone signal. The level of the loudspeaker signal is increased when the received microphone signal increases, and vice versa, allowing the user to control the loudspeaker level by adjusting mouth-to-microphone distance or speech loudness. This solution to control the loudspeaker level is, however, not applicable or useful in a mobile phone in order to provide an automatic adjustment of the sound level in the loudspeaker. A high speech loudness or short mouth-to-microphone distance increases the loudspeaker audible level, which can impair the hearing of a person using such a phone. Another reason for not using this proposed solution is that the loudspeaker level only responds to the received microphone signal.

GB-A-2 203 315 discloses a multi-phonic balancer having measuring devices mounted on each speaker arranged to determine the relative distance of the speakers from a listener by means of signals reflected from the listener. Further, control means are arranged to vary the respective volumes of sound reproduction from the system. However, the distance measurement is limited to either ultrasonic or infra red techniques.

SUMMARY

It is an object of the present invention to provide a proximity detector for use in a mobile telephone apparatus, enabling automatic adjustment of the loudspeaker sound level in the phone depending on the current distance between the phone and the ear of the user.

This is accomplished by a sound-based proximity detector according to the invention, which compares a control signal reproduced by the loudspeaker of the phone and transmitted directly to the microphone and the control signal reflected from the user of the phone to the microphone in order to determine the distance between the phone and the user. Further, signal level control means varies the signal level of a reproduced audible signal from the loudspeaker proportionally to the determined distance between the phone and the user of the phone.

Another object of the invention is to provide a mobile telephone apparatus, providing sound-based proximity detection in order to vary the loudspeaker sound level in accordance with a current distance between the phone and the user of the phone.

This object is accomplished by a mobile telephone apparatus comprising a proximity detector according to the invention.

A further object of the invention is to provide a method for sound-based proximity detection in a mobile telephone apparatus.

An advantage of the present invention is that the sound from the loudspeaker in the phone is adjusted automatically in accordance with the current distance between the phone and the user, wherein a suitable sound level is provided for the user independent of the distance between the phone and the user.

BRIEF DESCRIPTION OF THE DRAWINGS

Other object, advantages and features of the invention will become more apparent from the following detailed description when taken in conjunction with the accompanying drawings, in which.

DETAILED DESCRIPTION

Figure 1:
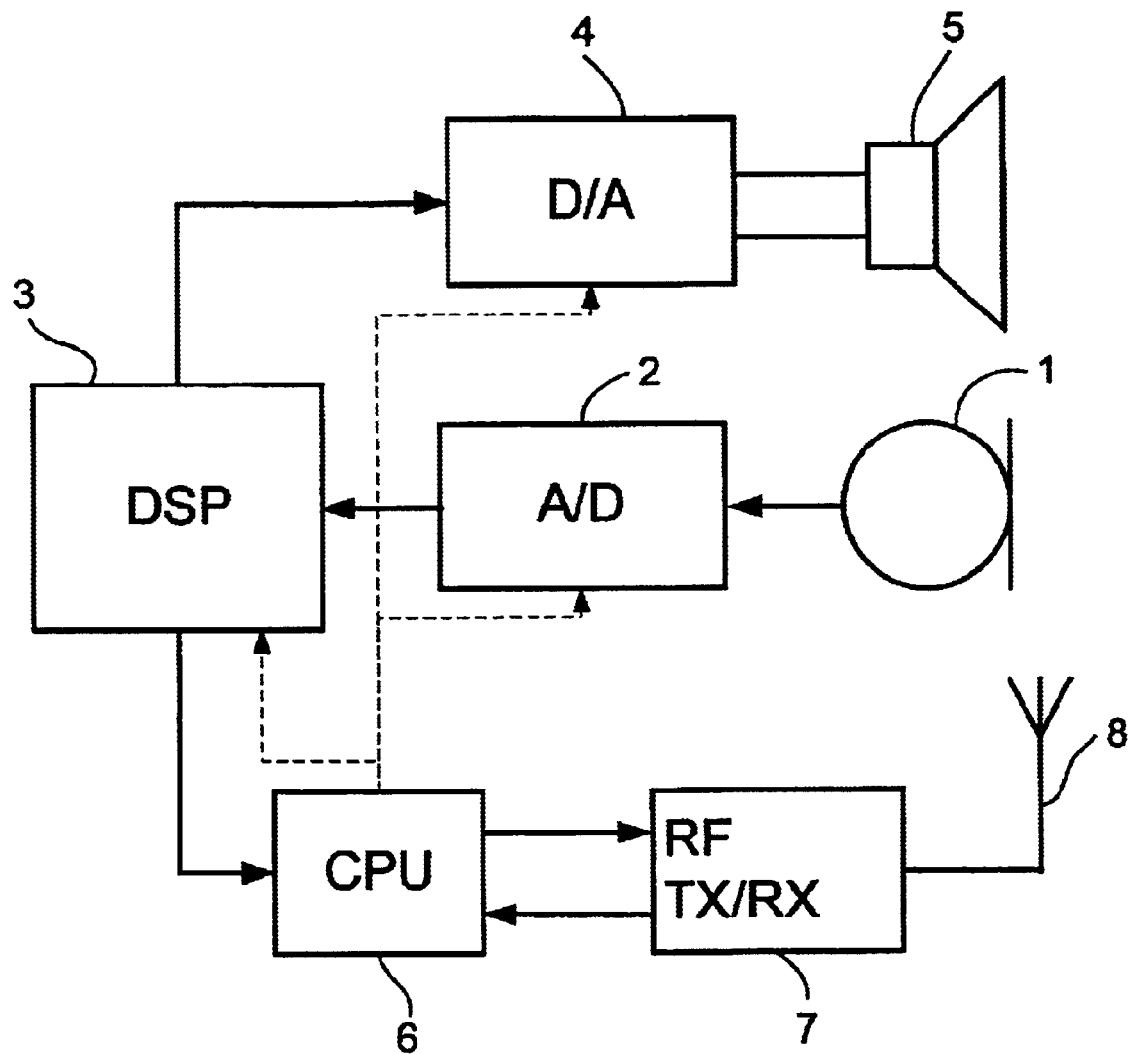
FIG. 1 is a block diagram of a mobile telephone apparatus comprising means for sound-based proximity detection according to the invention.

With reference to FIG. 1 of the drawings, there is shown a block diagram of a mobile telephone apparatus comprising a microphone 1, which is adapted to receive sound waves from for example a human voice of a user of the phone for conversion into an analog signal. The microphone is connected to an analog-to-digital (AD) converter 2, which converts the analog signal from the microphone to a digital signal before input to a digital signal processor 3 (DSP). The DSP 3 processes the digital signal from the AD converter 2 and then inputs the signal to a digital-to-analog (DA) converter 4, which converts the digital signal to an analog signal for reproduction by a loudspeaker 5 connected to the DA converter. Further, a central processing unit (CPU) 6 is provided in the phone for interpretation and execution of program instructions for controlling the operations of other components and blocks in the phone, such as the AD converter 2, the DSP 3, and the DA converter 4. Also, the CPU 6 receives digital signals based on analog-to-digital converted signals from the AD converter 2, which have been processed by the DSP 3 for delivery to a radio frequency transmitter/receiver 7. The radio frequency transmitter generates an RF signal for transmission through an antenna 8 to a remote mobile phone, not shown in the drawings, via for example a base station in a cellular network.

Similarly, sound waves from a user of the remote mobile phone are converted into an RF signal for transmission via its RF transmitter and the base station in the cellular network. The RF signal is received via the antenna 8 and the RF receiver 7 from the base station. The radio frequency signal is then transmitted to the CPU 6, which controls the DSP 3 and the DA converter 4 for reproducing an appropriate analog sound signal in the loudspeaker 5 corresponding to the received signal from the remote phone.

Figure 2A:
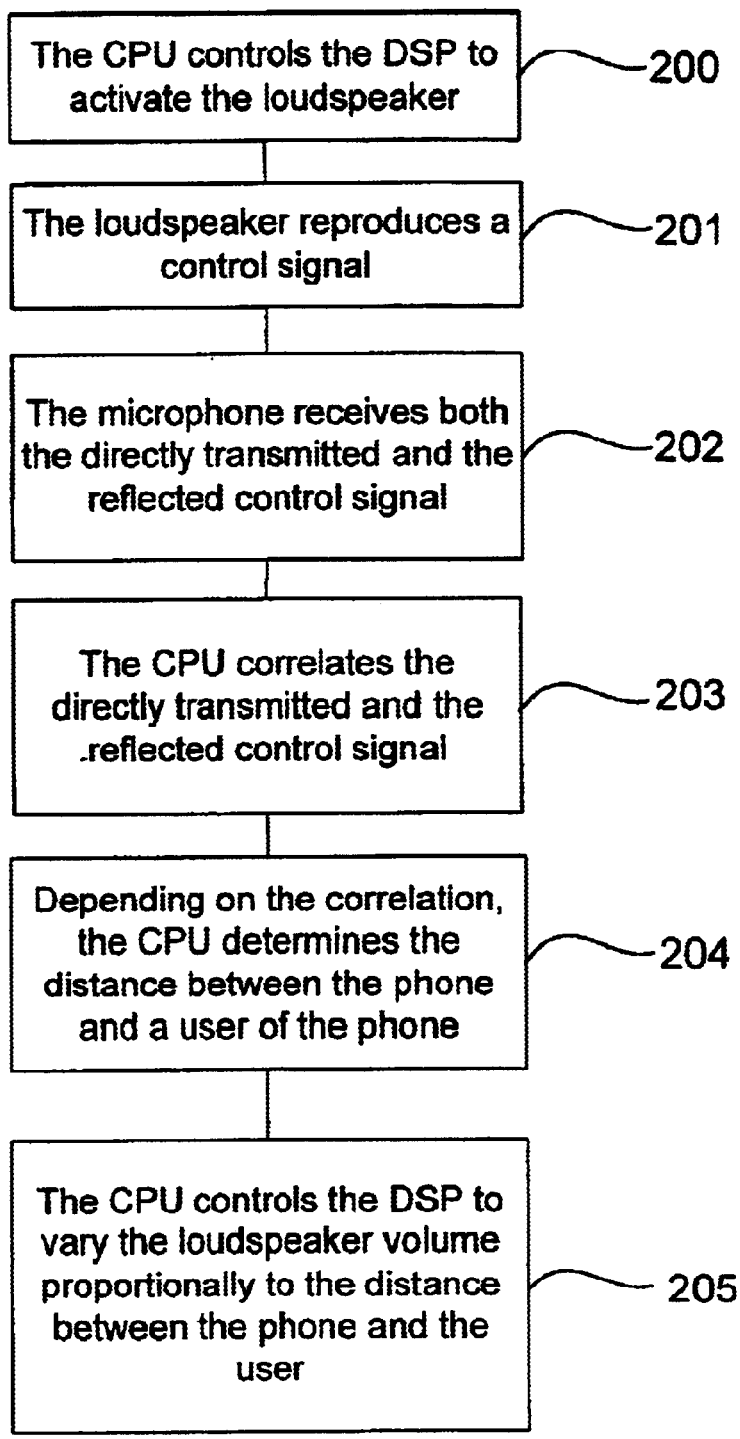
FIG. 2A is a flowchart for a first embodiment of a method according to the invention.
Figure 3A:
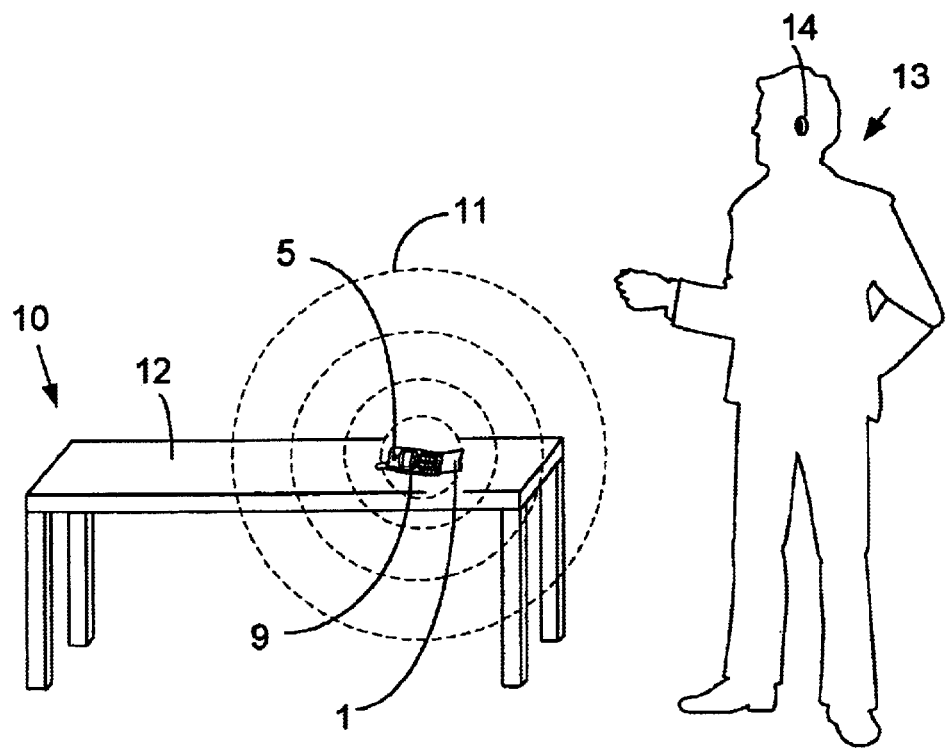
FIG. 3A illustrates the mobile telephone apparatus according to the invention located on a table.
Figure 3B:
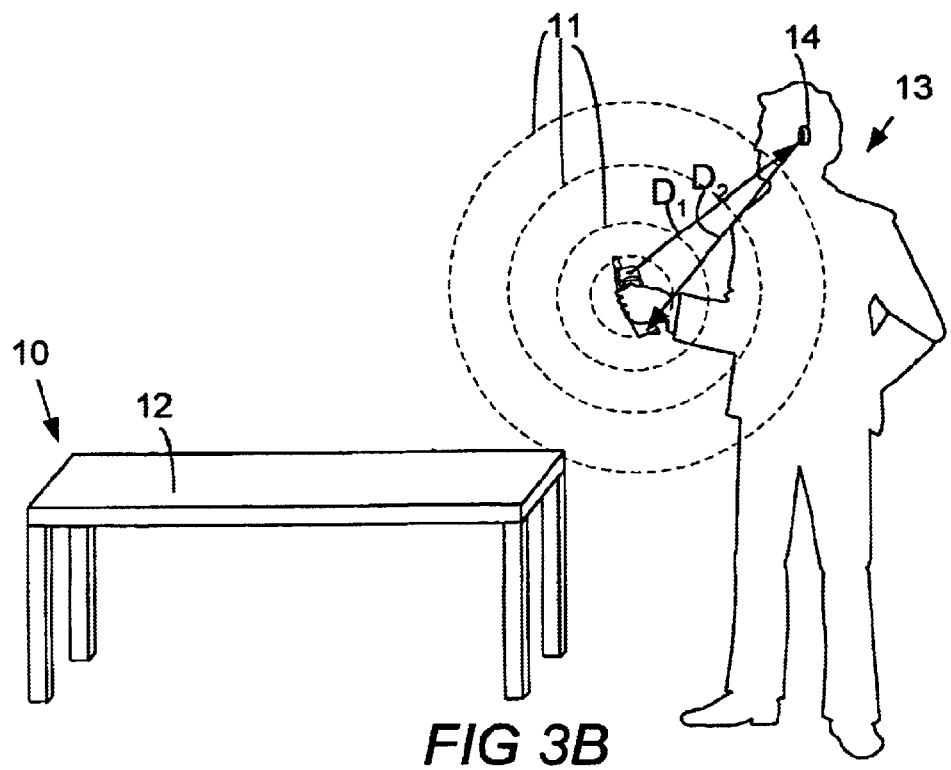
FIG. 3B illustrates a user holding the mobile telephone apparatus according to the invention.

According to a first embodiment of the invention, the mobile telephone apparatus comprises means for sound-based proximity detection of sound signals reproduced by the loudspeaker in the phonedepending on the distance between the phone and the user of the phone. With reference to FIGS. 2A, 3A, and 3B, the following steps are performed when the sound level or volume is adjusted in the phone according to the first embodiment of the invention.

The CPU 5 executes instructions for controlling the DSP 3 and the DA converter 4 in step 200 in order to make the loudspeaker to reproduce an acoustic control signal in step 201. In a situation where a mobile telephone apparatus 9 is placed on a table 10 as shown in FIG. 3A, the control signal, illustrated by the dashed circles 11, is directly transmitted to and received by the microphone 1 in step 202. Simultaneously, the control signal is reflected in the surface 12 of the table causing a reflected signal or signals, which also are received in the microphone 1 in step 202.

When a user 13 of the phone picks up the phone from the table 10 in a direction towards his ear 14, as shown in FIG. 3B, the reflected signal or signals to the phone 9 will change both regarding time and amplitude. These changes in time and amplitude of the signal are used by the CPU 6 for determining the distance between the loudspeaker 5 and the ear of the user in order to control the sound level or volume of the reproduced sound signal from the loudspeaker 5.

The distance $D_1 \approx D_2$ between the ear 14 of the user and the phone is calculated by using the sound velocity and the transmission time for the control signal from the loudspeaker 5 to the ear 14 or head of the person and reverse to the microphone 1.

Another way to determine the distance is to detect the sound level of the reflected signal compared to the sound level of the signal directly transmitted from the loudspeaker to the microphone. Additionally, it is possible to combine the both ways. The CPU 5 and the DSP 3 perform the transmission time measurement and the sound level determination.

A reason for the combination of the methods is that it is not certain that the signal transmitted directly from the loudspeaker 5 to the microphone 1 is the strongest signal due to unfavourable directional effects of the loudspeaker and the microphone. Thus, in this case it would not be enough to determine the sound level, but by a combination of the sound level and the transmission time determination, an accurate value of the distance is determined.

Figure 4:
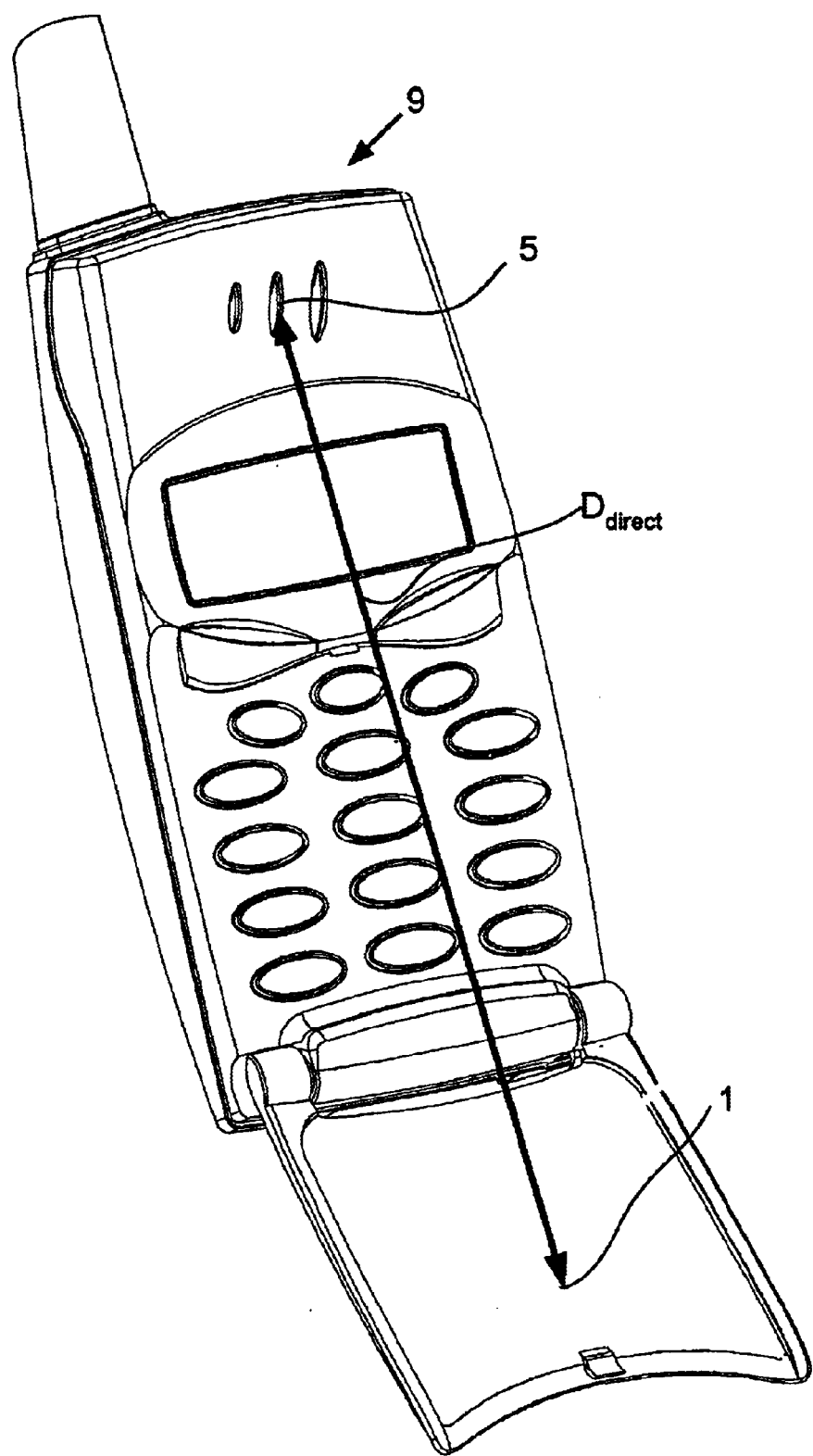
FIG. 4 is a perspective view of the mobile telephone apparatus providing sound-based proximity detection according to the invention.

The control signal reproduced by the loudspeaker 5 is a known signal and the transmission time of the control signal from the loudspeaker 5 directly to the microphone 1 as well as the distance $D_{direct}$, illustrated in FIG. 4, between the loudspeaker 5 and the microphone 1 are known. The microphone 1 receives the directly transmitted signal, and the AD converter 2 converts the signal before the digital signal is input to the DSP 3. In the same way, various reflections from the control signal are received by the microphone 1 and converted before delivery to the DSP 3. As described, the features of the known transmitted control signal are correlated with the received signals in step 203. If the received signal is the directly transmitted signal or a reflected signal is determined by analysing "when" each signal is received by the microphone 1. When the telephone is close to the ear, the strongest reflection is probably received from the person 13. In that way it is possible to determine if the strongest received signal is a directly transmitted signal from the loudspeaker 5 to the microphone 1 or a reflection from the person 13. A strong reflection corresponds to a short distance $D_1 \approx D_2$ to the person 13, which is determined in step 204. Depending on the determined distance $D_1 \approx D_2$, the phone 9 and the CPU 6 controls the DSP 3 to generate a signal for the DA converter 4 which controls the loudspeaker 5 to reproduce an audible signal level proportionally to the determined distance $D_1$ between the phone and the user 13 in step 205. Thus, a short distance causes a low level of the volume and a longer distance causes a higher volume of the reproduced signal.

Figure 2B:
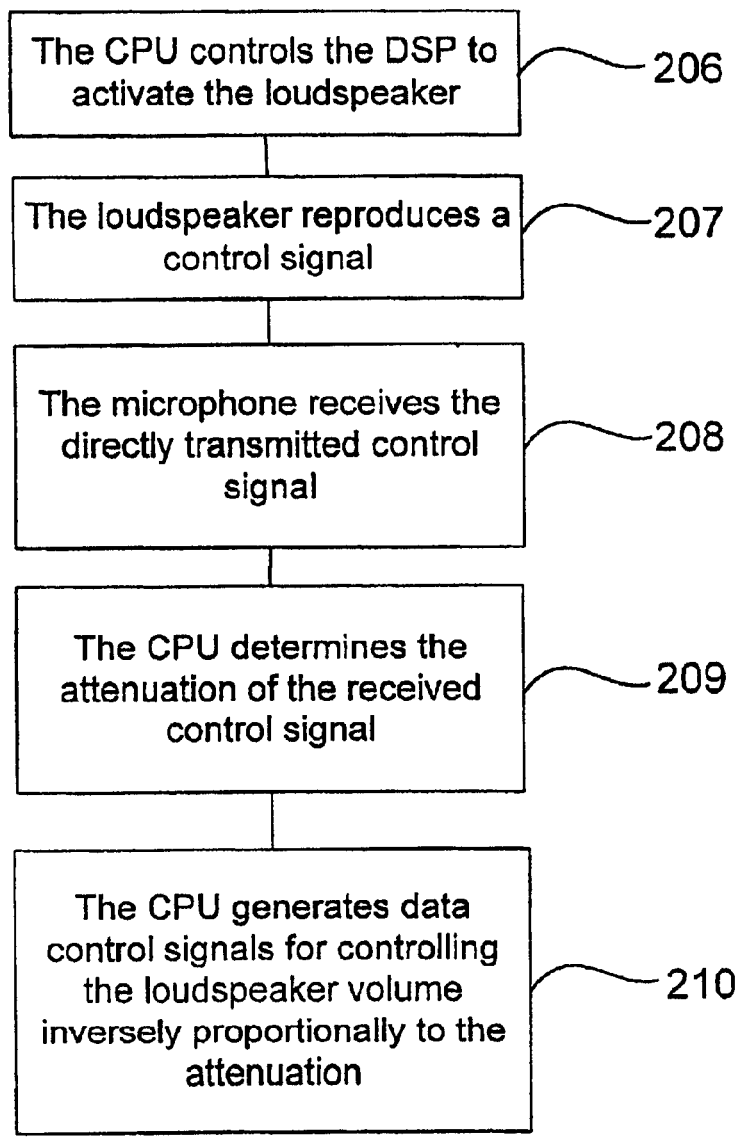
FIG. 2B is a flowchart for a second embodiment of a method according to the invention.

When the telephone is held very close to the ear 14, the directly transmitted signal will be attenuated. Hence, a decreased amplitude of the received directly transmitted signal is another parameter indicative of that the phone is close to the ear. Thus, in a second embodiment of the invention, the mobile telephone apparatus comprises means for sound-based proximity detection performing automatic volume adjustment of sound signals reproduced by the loudspeaker in the phonedepending on the attenuation of the directly transmitted signal from the loudspeaker 5 to the microphone 1. With reference to FIGS. 2B, the following steps are performed when the sound level or volume is adjusted in the phone according to the second embodiment of the invention.

The CPU 5 executes instructions for controlling the DSP 3 and the DA converter 4 in step 206 in order to make the loudspeaker to reproduce an acoustic control signal in step 207. If the telephone is held very close to the ear 14, the directly transmitted signal is attenuated before it is received by the microphone in step 208.

The attenuation of the directly transmitted control signal is determined by comparing the amplitude of the known transmitted control signal and the amplitude of the received signal in the CPU 6 in step 209. Then, the CPU 6 controls the DSP 3 to generate a signal for the DA converter 4 which controls the loudspeaker 5 to reproduce an audible signal level inversely proportionally to the current attenuation in step 210.

In an alternative embodiment of the invention the first and second embodiment are combined. The mobile telephone apparatus comprises means for sound-based proximity detection performing automatic volume adjustment of sound signals reproduced by the loudspeaker in the phone depending on the distance between the phone and the user of the phone as well as means for sound-based proximity detection for automatic volume adjustment of sound signals reproduced by the loudspeaker in the phonedepending on the attenuation of the directly transmitted signal from the loudspeaker 5 to the microphone 1. For example, the first method is employed until the phone is close to the ear and the directly transmitted signal is attenuated. Then, the second method is employed. However, if the phone is moved away from the user, the first method starts to operate again.

Although the invention has been described by way of a specific embodiment thereof, it should be apparent that the present invention provides a method and apparatus for sound-based proximity detection that fully satisfy the aims and advantages set forth above, and alternatives and modifications are possible within the scope of the invention.

For example, either an audible or preferably an ultrasonic signal can be used as the control signal.

The control signal does not have to be a dedicated signal—the ring or voice signal may also be employed if proper correlation is done after the microphone.

What is claimed is:

1. A proximity detector for use in a mobile telephone having at least a microphone and a loudspeaker operatively connected to signal processing means, the proximity detector comprising:
    data processing and control means including means for controlling the signal processing means for activating the loudspeaker to reproduce an acoustic control signal;
    correlating means for correlating a control signal received directly by the microphone and control signal reflected from a user of the telephone and then received by the microphone for determining a distance between the telephone and the user based on a known direct distance between the microphone and the loudspeaker, wherein a difference between a time of receipt of the directly received control signal and a time of receipt of the reflected control signal corresponds to the determined distance between the telephone and the user; and
    signal level control means for controlling the signal processing means for varying the signal level of an audible signal reproduced by the loudspeaker proportionally to the determined distance.

2. The proximity detector according to claim 1, wherein the data processing and control means include:
    attenuation determining means for determining the attenuation of the control signal received directly by the microphone; and
    means for varying the signal level of an audible signal reproduced by the loudspeaker inversely proportionally to the attenuation.

3. The proximity detector according to claim 1, wherein the correlating means include means for comparing the signal level of the directly received control signal with the signal level of the reflected control signal for determining the distance between the telephone and the user.

4. The proximity detector according to claim 1, wherein the correlating means include means for comparing a signal delay of the directly received control signal with a signal delay of the reflected control signal for determining the distance between the telephone and the user.

5. The proximity detector according to claim 1, wherein the control signal is an ultrasonic signal.

6. The proximity detector according to calm 1, wherein the control signal is an audible signal.

7. The proximity detector according to claim 1, wherein the control signal is a ring or a voice signal.

8. A proximity detector for use in a mobile telephone having at least a microphone and a loudspeaker operatively connected to signal processing means, the proximity detector comprising:
    data processing and control means including means for controlling the signal processing means for activating the loudspeaker to reproduce an acoustic control signal;
    correlating means for correlating a control signal received directly by the microphone and a control signal reflected from a user of the telephone and then user based on a known direct distance between the microphone and the loudspeaker, wherein a difference between a time of receipt of the directly received control signal and a time of receipt of the reflected control signal corresponds to the determined distance between the telephone and the user:
    means for determining the attenuation of the control signal received directly by the microphone; and
    means for varying the signal level of an audible signal reproduced by the loudspeaker inversely proportionally to the attenuation.

9. A mobile telephone apparatus, comprising:
    a microphone;
    a loudspeaker;
    signal processing means operatively coupled to the loudspeaker; and
    a proximity detector including
        data processing end control means including means for controlling the signal processing means for activating the loudspeaker to reproduce an acoustic control signal;
        correlating means for correlating a control signal received directly by the microphone and the control signal reflected from a user of the telephone and then received by the microphone for determining a distance between the telephone and the user based on a known direct distance between the microphone and the loudspeaker, a time of receipt of the reflected control signal corresponds to the determined distance between the telephone and the user; and signal level control means for controlling the signal processing means for varying the signal level of an audible signal reproduced by the loudspeaker proportionally to the determined distance.

10. A method for sound-based proximity detection in a mobile telephone having at least a microphone and a loudspeaker operatively connected to signal processing means, the method comprising the steps of:

controlling the signal-processing means to activate the loudspeaker to reproduce an acoustic control signal;

receiving fist and second control signals from the microphone corresponding to an acoustic control signal received directly from the loudspeaker and an acoustic control signal reflected from a user of the telephone and then received, respectively;

correlating the first and second control signals to determine the distance between the telephone and the user based on a known direct distance between the microphone and the loudspeaker, wherein a difference between a time of receipt of the directly received control signal and a time of receipt of the reflected control signal corresponds to the determined distance between the telephone and the user; and generating a data control signal for the signal processing means to activate the loudspeaker for reproducing audible signals having a signal level that is proportional to the determined distance between the telephone and the user.

11. The method according to claim 10, further comprising the steps of:

determining the attenuation of the control signal received directly from the loudspeaker; and varying the signal level or an audible signal reproduced by the loudspeaker inversely proportionally to the attenuation.

12. A method for sound-based proximity detection in a mobile telephone having at least a microphone and a loudspeaker operatively connected to signal processing means, the method comprising the steps of:

controlling the signal processing means to activate the loudspeaker to reproduce an acoustic control signal;

correlating first and second acoustic control signals to determine the distance between the telephone and a user based on a known direct distance between the microphone and the loudspeaker, wherein a difference between a time of receipt of the first acoustic control signal that is directly received and a time of receipt of the second acoustic control signal that is reflected from the user corresponds to the determined distance between the telephone and the user;

determining the attenuation of the first acoustic control signal transmitted directly to the microphone from the loudspeaker; and controlling the signal processing means to vary the signal level of an audible signal reproduced by the loudspeaker inversely proportionally to the attenuation.

* * * * *